(12) United States Patent
Lee

(10) Patent No.: US 10,765,211 B2
(45) Date of Patent: Sep. 8, 2020

(54) FURNITURE COMPONENT AND METHOD OF FORMING SUCH A FURNITURE COMPONENT

(71) Applicant: JBL INTERNATIONAL, INC, Houston, TX (US)

(72) Inventor: Justin Lee, Houston, TX (US)

(73) Assignee: JBL INTERNATIONAL, INC, Houston, TX (US)

( * ) Notice: Subject to any disclaimer, the term of this patent is extended or adjusted under 35 U.S.C. 154(b) by 96 days.

(21) Appl. No.: 16/200,119

(22) Filed: Nov. 26, 2018

(65) Prior Publication Data

US 2020/0163457 A1    May 28, 2020

(51) Int. Cl.
| | |
|---|---|
| *B32B 21/13* | (2006.01) |
| *A47B 96/20* | (2006.01) |
| *B27M 3/18* | (2006.01) |
| *E04C 3/12* | (2006.01) |
| *E04C 3/36* | (2006.01) |

(52) U.S. Cl.
CPC ............... *A47B 96/20* (2013.01); *B27M 3/18* (2013.01); *B32B 21/13* (2013.01); *E04C 3/12* (2013.01); *E04C 3/122* (2013.01); *E04C 3/36* (2013.01); *Y10T 428/16* (2015.01)

(58) Field of Classification Search
CPC .............................. Y10T 428/16; B32B 21/13
See application file for complete search history.

(56) References Cited

U.S. PATENT DOCUMENTS

| | | |
|---|---|---|
| 2,306,295 A | 12/1942 | Casto |
| 2,903,390 A | 9/1959 | Kojima |
| 3,916,059 A | 10/1975 | Molloy et al. |
| 4,399,754 A | 8/1983 | Emery |
| 5,284,380 A | 2/1994 | Gehry |
| 7,806,155 B1 | 10/2010 | Lee |
| 2005/0069690 A1 | 3/2005 | Walz |
| 2009/0291286 A1 | 11/2009 | Shen |

FOREIGN PATENT DOCUMENTS

CA    2971049 A1 *   8/2017   ............... B32B 3/04

* cited by examiner

*Primary Examiner* — Alexander S Thomas
(74) *Attorney, Agent, or Firm* — Egbert Law Offices, PLLC

(57) ABSTRACT

A furniture component has a central member, a pair of sides of each defined by a chord of a circle, a first element affixed to the top of the central member, and a second element affixed to the bottom of the central member. The pair of segments are respectively affixed to the sides of the central member. The central member, the pair of segments and the first and second elements are formed of a wooden material. The central member has a generally square configuration. The central member is entirely surrounded by the pair of segments and the first and second elements. Each of the pair of segments in each of the first and second elements having a planar side affixed to the central member and a curved surface opposite to the planar surface.

9 Claims, 3 Drawing Sheets

FURNITURE COMPONENT AND METHOD OF FORMING SUCH A FURNITURE COMPONENT

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the manufacture of furniture. More particularly, the present invention relates to the forming of a furniture component having a circular cross-section. More particularly, the present invention the relates to the present invention relates to methods for forming such a circular furniture component.

2. Description of Related Art Including Information Disclosed Under 37 CFR 1.97 and 37 CFR 1.98

Wooden furniture is a very popular type of furniture. Typical wooden furniture can be used for chairs, for benches, for bed frames, for tables, and for similar items. Typically, wooden furniture is formed from laminated material. Whenever curved surfaces are required for such wooden furniture, it is typical to use a router in order to form the curved elements of the wooden furniture.

The use of logs to construct furniture is well-known. As with the use of logs to create log homes, the use of logs and furniture is appealing both structurally and aesthetically. Throughout the world, many vendors sell articles of furniture constructed from logs of various types of material. Log furniture can take the form of almost any type of furniture, from bedroom furniture sets to pool tables. Additionally, log furniture can be well-suited for outdoor use, such as patio furniture sets.

FIG. 1 shows the type of log furniture that was the subject of U.S. Pat. No. 7,806,155 to the present Applicant. The wooden chair 10 shown in FIG. 1. The chair 10 is formed of various legs 12 and 14. Leg 14 extends downwardly at an angle from leg 12. A backrest 16 is affixed to leg 14 and extends upwardly therefrom. Armrest 18 is affixed to the top of leg 12 and is affixed to a mid-portion of the backrest 16. Each of the legs 12 and 14, the backrest 16 and armrest 18 are formed of a furniture component having a circular cross-section. Each of the legs 12 and 14, the backrest 16 and the armrest 18 can be bolted together so as to form a secure chair 10.

Plywood, oriented strand board, and particleboard are all examples of laminated wood. Lamination is the process of creating a rigid product by compressing thin sheets are small pieces of wood together to form a larger piece by using glue. Manufacturers of laminated wood products use pressure and heat to compress the small wood pieces into the large pieces. Laminated wood products are very strong, but they are not indestructible.

FIG. 2 shows an example of how the circular component 20 is formed from the laminated wood 22. Laminated wood 22 has laminations 24, 26 and 28 that are secured together. A router is then used so as to form the circular component 20. As such, the router removes those excess pieces of lamination from the circular component 20.

FIG. 3 shows the finished circular component 20. As can be seen, there is a central laminated element 30 and outer laminated elements 32 and 34. When a router is used to form the circular component, the various laminations can be visible from the exterior of the furniture. Many consumers consider laminated furniture to be inferior and aesthetically unpleasing. Whenever the laminations are visible from the exterior of the article of furniture, this will decrease the value of the article of furniture. Additionally, the use of a router to form the circular component 20 is rather time-consuming. The laminations, and the glue associated therewith, can often appear inconsistent between identical circular components. Additionally, it is known that laminations can separate over time by infiltration of water or from continuous use. Whenever the laminations are separated, a further aesthetically unpleasing appearance is created.

In the past, various patents have issued relating to furniture components and methods for creating such furniture components. For example, U.S. Pat. No. 2,306,295, issued on Dec. 22, 1942 to L. B. Casto, describes a method of making laminated furniture panels. This method comprises applying an undecorated side of a thin sheet of metal having a sufficiently high heat conductivity factor to disperse heat away from the localized zone of concentrated heat, applying an adhesive material in the form of a varnish, drying or baking the adhesive before the decorative coating is applied to the sheet, applying decorative coatings of finishing materials, and subjecting the decorated sheet to a baking temperature in order to cause the baked sheet to adhere to a base structure formed of wood or other fibrous material. An adhesive is interposed between the baked underside of the sheet and the base. The sheet and the base are subsequently subjected to pressure.

U.S. Pat. No. 2,903,390, issued on Sep. 8, 1959 to S. Kojima, provides a method of making laminated furniture or a part thereof. This method comprising stacking up in registration a series of sheets of material. Each sheet comprises a portion that constitutes one of the component layers of the laminated furniture. A bonding agent is applied to the portions of each sheet which are to form a layer of the laminated structure. The stack of sheets is clamped while heating so that the first portions of respective sheets are secured together in fixed and rigid relation to form an integral laminated structure. The remaining portions of respective sheets are removed from the integral structure.

U.S. Pat. No. 3,916,059, issued Oct. 28, 1975 to Molloy et al., provides a laminated panel for furniture construction. Crossbanding sheets are made of a combination of glass fibers and cellulose fibers held together by binding extending throughout the sheet. The fibers of the crossbanded sheets may be oriented in a direction perpendicular to the direction of the orientation of the wood chips or grain in a wood core to which the crossbanding sheets are adhered. A decorative surface is applied to the outer surface of one of the crossbanding sheets with an orientation parallel to that of the core. A backing sheet is adhered to the outer surface of another of the cross banding sheets with the orientation thereof parallel to the core.

U.S. Pat. No. 4,399,754, issued on Aug. 23, 1983 to F. Emery, teaches a laminated wood corner structure for furniture. This corner construction comprises two laminated wood legs bent at 90° angles and bisected on a 45° diagonal throughout their length and glued together. The method of the corner construction includes taking thin wood laminae and applying glue and assembling the laminae with a right angle band. The laminae is clamped in a mold while the glue hardens. The molded sheets are cut into strips. Each strip is bisected on a 45° angle throughout its length. Two bisected strips are glued together with the upper bent portions running at right angles to the other.

U.S. Pat. No. 5,284,380, issued on February, 1994 to F. O. Gehry, shows furniture comprising laminated slats. The furniture comprises a strong, aesthetically appealing, woven lattice of interlocking slats made of wood laminate having indentations allowing the fitting of the slats across one another so as to form a lattice. The furniture is manufactured of a single type of material.

U.S. Patent Application Publication No. 2005/0069690, published on Mar. 31, 2005 to Walz et al., provides laminate materials for furniture. The laminate materials include several interleaved wood veneer and carbon fiber layers. A thickness and characteristics of these layers are chosen so that the resulting material can be used either as a support material, such as a leg, that must withstand large tensile and/or compressive forces.

U.S. Patent Application Publication No. 2009/0291286, published on Nov. 26, 2009 to Z. Shen, discloses a laminate manufacturing system having a core of fresh or green wood and/or recycled wood products. The wood materials are processed down to a particle size of less than 5 mm and bonded together with glue. The opposing surfaces of the inner veneer are bonded to opposing surfaces of the core with glue. Opposing surface outer veneer is bonded to the opposing surface inner veneer with glue. The opposing edge veneer is bonded to the opposing edges of the core with glue.

It is an object of the present invention to provide a furniture component and method of manufacturing a furniture component which produces a more consistent appearance.

It is another object of the present invention to provide a furniture component and method of manufacturing a furniture component which is less expensive to manufacture.

It is another object of the present invention to provide a furniture component and method of manufacturing the furniture component which avoids the separation of laminates from each other.

It is still another object of the present invention to provide a furniture component and a method of manufacturing a furniture component which is more aesthetically appealing.

These and other objects and advantages of the present invention will become apparent from a reading of the attached specification and appended claims.

BRIEF SUMMARY OF THE INVENTION

The present invention is a furniture component that comprises a central member, a pair of segments each defined by a chord of a circle, and first and second elements. The central member has a top, a bottom, a first side and a second side extending between the top and the bottom. The pair of segments are respectively affixed to the first and second sides. The first element is affixed to a top of the central member. The second element is affixed to the bottom of the central member.

In the present invention, the central member, the pair of segments, and the first and second elements are formed of a wooden material. The central member has a generally square cross-section. The central member is formed of a plurality of panels or sheets that are laminated together. The central member is entirely surrounded by the pair of segments and the first and second elements.

One of the pair of segments has a planar side affixed to the central member and a curved surface opposite to the planar surface. The curved surface forms an exterior of the furniture component. The planar surface has a length greater than a length of the first side of the central member. Another of the pair of segments also has a planar side affixed to the central member and a curved surface opposite to the planar surface. The curved surface of the another of the pair of segments forms an exterior of the furniture component. The planar surfaces of the pair of segments define spaces therebetween at the top of the central member and at the bottom of the central member. The first element is positioned in the space of the top of the central member. The second element is positioned in the space at the bottom of the central member. The first element has a planar surface affixed to the top of the central member. The second element has a planar surface affixed to the bottom of the central member. Each of the first and second elements has a curved surface opposite the planar surface. The curved surfaces of the first and second elements are continuous with the curved surfaces of the pair of segments. The curved surfaces of the pair of segments and the first and second elements are arranged in a circular configuration. The pair of segments and the first and second elements are adhesively affixed to the central member.

The present invention is also a method of manufacturing a furniture component. This method includes the steps of: (1) forming a central member having a generally square or rectangular configuration; (2) affixing a pair of segments opposite sides of the central member; and (3) affixing a pair of elements respectively to a top and a bottom of the central member. This method further can include forming the pair of segments so as to have a planar surface and a curved surface opposite to the planar surface. The planar surface has a length greater than a length of the side of the central member.

The step of affixing the pair of segments includes affixing the pair of segments to the sides of the central member such that the planar surfaces extend outwardly at the top and the bottom of the central member so as to define a space therebetween at each of the top and the bottom of the central member. The pair of elements are respectively inserted into the spaces at the top and the bottom of the central member. Each of the pair of elements has a planar surface and a curved surface. The pair of elements are positioned respectively against the top of the bottom of the central member such that the curved surfaces of the pair of elements are continuous with the curved surfaces of the pair of segments. The central member, the pair of segments and the pair of elements are formed of a wooden material.

This foregoing Section is intended to describe, with particularity, the preferred embodiment of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
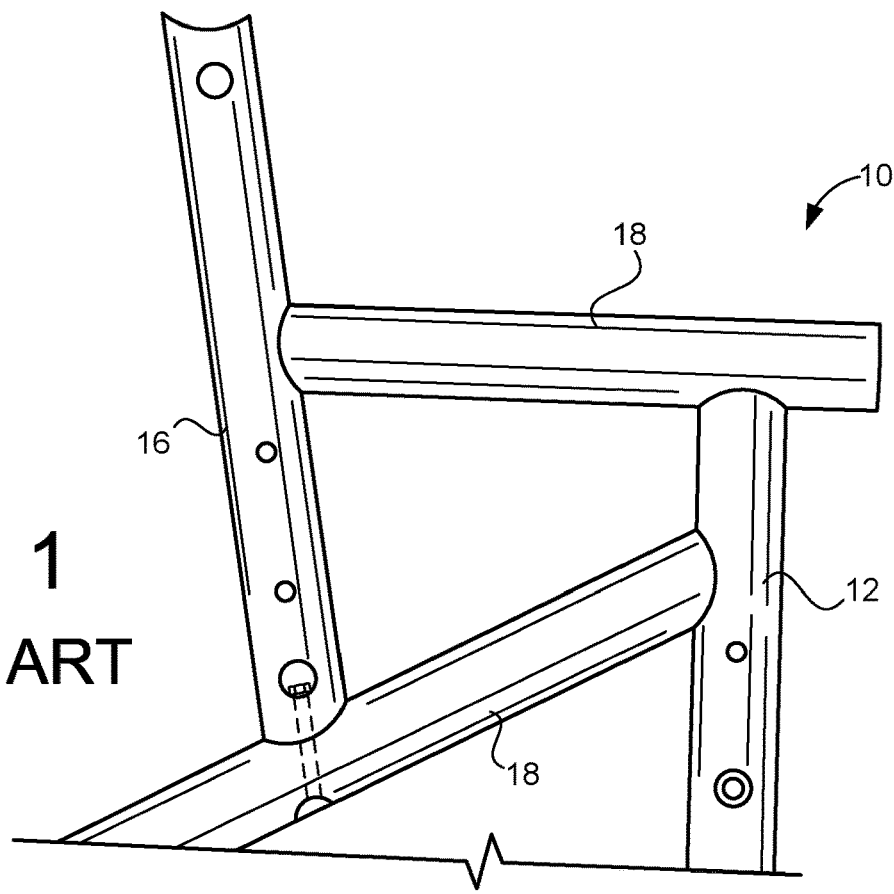
FIG. 1 is a side elevational view of a prior art furniture article being formed of furniture components having generally circular cross-sections.
Figure 2:
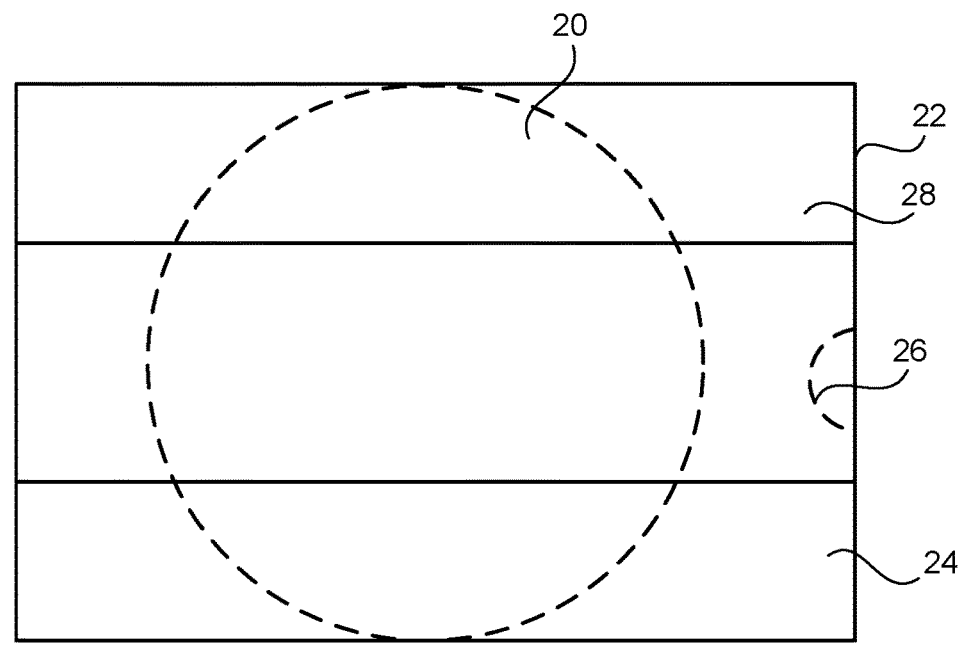
FIG. 2 is a cross-sectional view of the arrangement of laminations from which the furniture component of the prior art is formed.
Figure 3:
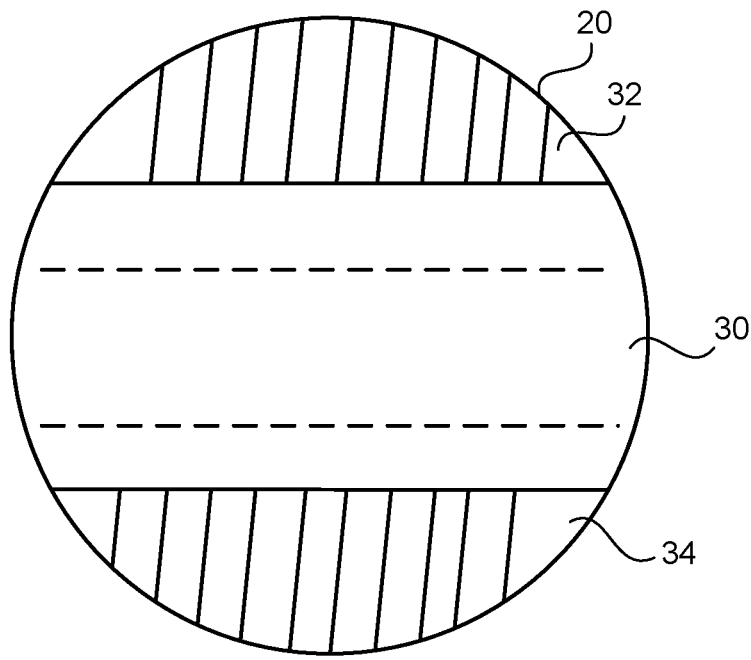
FIG. 3 is a cross-sectional view showing the furniture component formed in accordance with the prior art.
Figure 4:
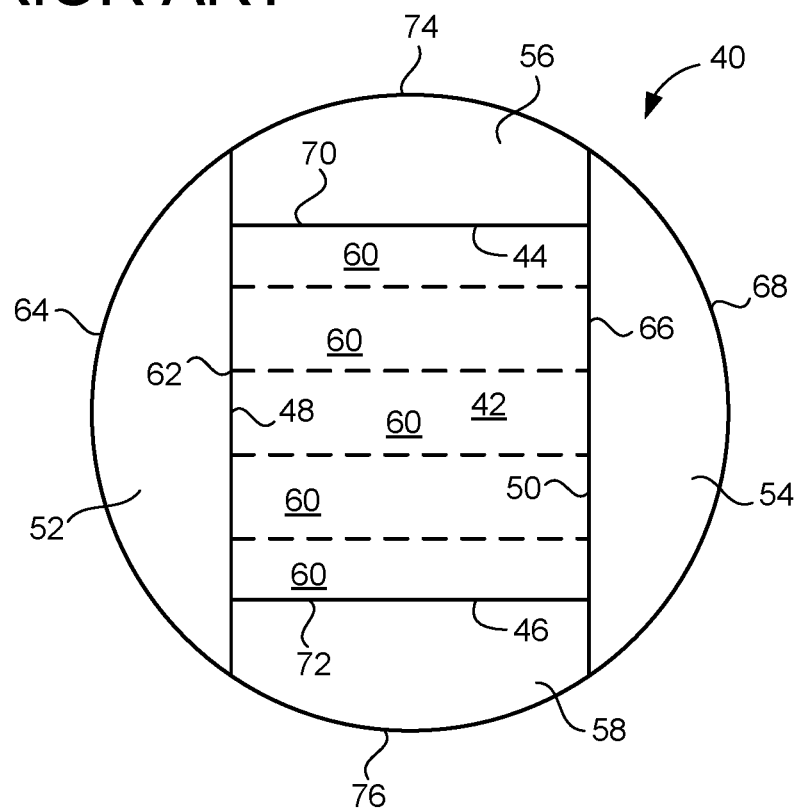
FIG. 4 is a cross-sectional view of the furniture component of the present invention.

Referring to FIG. 4, there is shown the furniture component 40 in accordance of the teachings of the present invention. The furniture component 40 includes a central member 42 having a top 44, a bottom 46, and sides 48 and 50. A pair of segments 52 and 54 are each defined by a chord of a circle. The pair of segments 52 and 54 are respectively affixed to the sides 48 and 50. A first element 56 is affixed to the top 44 of the central member 42. A second element 58 is affixed to the bottom 46 of the central member 42. The central member 42, the pair of segments 52 and 54, the first element 56 and the second element 58 are formed of a wooden material.

In FIG. 4, it can be seen that the central member 42 has a generally square cross-section. The central member 42 is formed of a plurality of sheets or panels 60 that are laminated together. The central member 42 is entirely surrounded by the pair of segments 52 and 54, the first element 56 and the second element 58.

The segment 52 has a planar side 62 that is affixed to the side 48 of the central member 42 and a curved surface 64 opposite to the planar surface 62. The curved surface 64 forms an exterior of the furniture component. The planar surface 62 has a length that is greater than the length of the side 48 of the central member 42. The segment 58 also has a planar surface 66 and a curved surface 68 opposite to the planar surface 66. The planar surface 66 is affixed to the side 50 of the central member 52. The curved surface 68 also forms an exterior of the furniture component 40. The planar surface 66 also has a length greater than the length of the side 50 of the central member 42.

The planar surfaces 62 and 66 of the segments 52 and 54 will define a space therebetween at the top 44 and the bottom 46 of the central member 42. The first element 56 is positioned in the space at the top 44 of the central member 42. The second element 58 is positioned in the space at the bottom 46 of the central member 42. The first element 56 has a planar surface 70 affixed to the top 44 of the central member 42. The second element 58 also has a planar surface 72 affixed to the bottom 46 of the central member 42. The first element 56 has a curved surface 74 opposite to the planar surface 70. Similarly, the second element 58 has a curved surface 76 formed opposite to the planar surface 72.

In FIG. 4, it can be seen that the curved surfaces 74 and 76 are continuous with the curved surfaces 64 and 68. As such, the curved surfaces 64 and 68 of the segments 52 and 54 and the curved surfaces 74 and 76 of the first element 56 and the second element 58 are arranged in a circular configuration. The segments 52 and 54 and the elements 56 and 58 are adhesively affixed to the central member 42.

Figure 5:
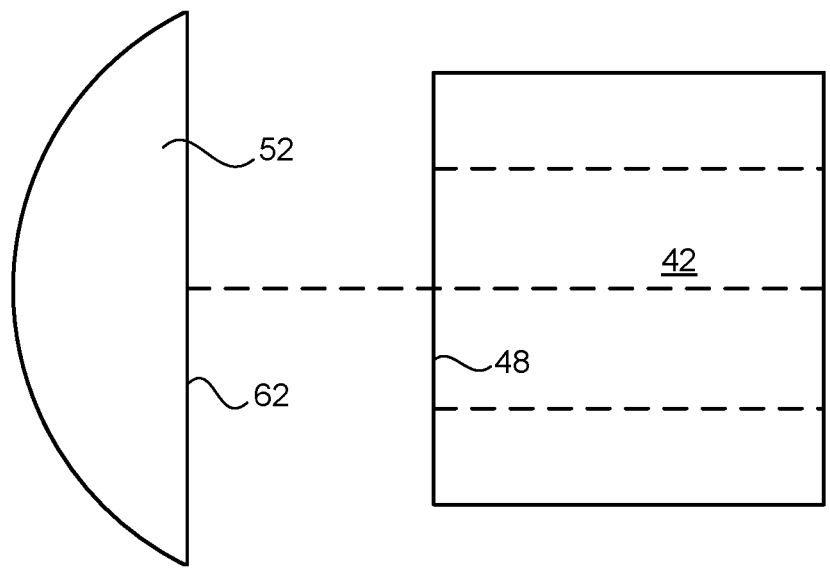
FIG. 5 is a cross-sectional exploded view of the furniture component of the present invention.

FIG. 5 shows how the segment 52 is affixed to the side 48 of the central member 42. In particular, adhesive can be applied to the planar surface 62 of the segment 52. The segment 52 is then moved toward the side 48 such that the planar surface 62 is bonded to the side 48 of the central member 42. The planar surface 62 is illustrated as having a length greater than the length of the side 48. The segment 54 is also secured to the central member 42 in a similar manner.

Figure 6:
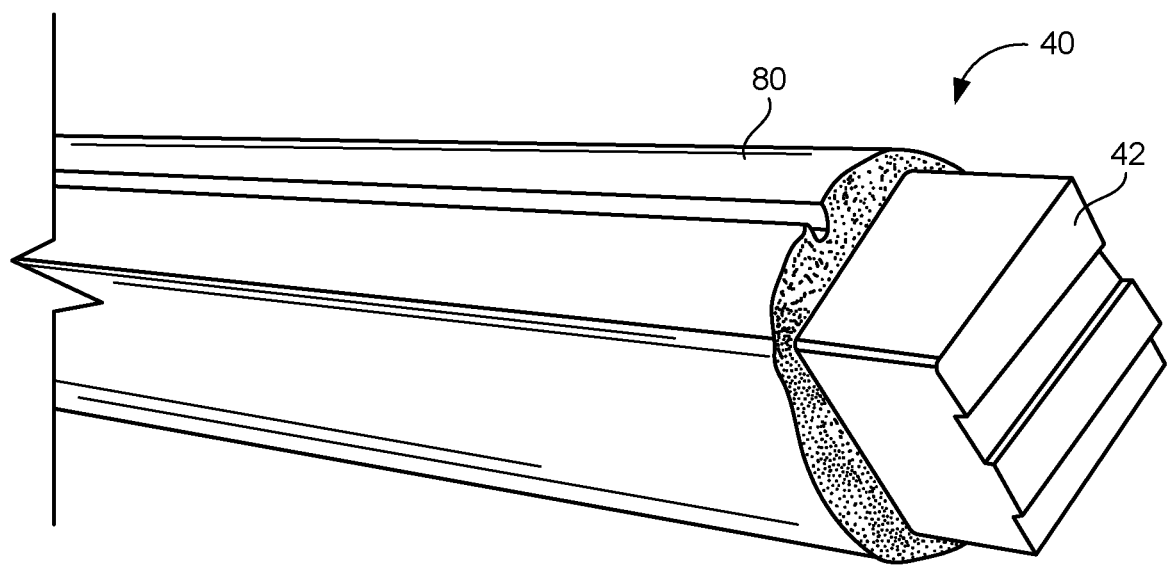
FIG. 6 is a cutaway perspective view of the furniture component of the present invention.

FIG. 6 is a cutaway view showing the furniture component 40 of the present invention. As can be seen, the central member 42 has a series of laminations. The central member 42 is of a generally square or rectangular configuration. The segments 52 and 54, along with the elements 56 and 58, provide a circular shape to an exterior 80 of the furniture component 40.

The configuration of the present invention will present a generally aesthetically pleasing circular configuration to the user. The laminations of the central member 42 will never be visible from the exterior of the furniture component. The furniture component 40 can be easily assembled together. As such, this avoids the routing costs associated with the prior art and will save costs of approximately 10% to 20%. The arrangement of the various elements and segments of the furniture component 40 will prevent any separation. The arrangement of the segments and the elements around the central member 42 avoids water infiltration to the laminated central member 42. As such, this further protects the laminations from separation. The only seams that will be visible from the exterior of the furniture component will be those small seams between the elements and the segments. The seams will not reside at the sides of the furniture component but only at the top and the bottom of the furniture component. As such, once again, this presents an aesthetically appealing appearance to the furniture component. The furniture component 40 can be used in a variety of positions on the item of furniture and with a wide variety of furniture items.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A furniture component comprising:
   a central member having a top, a bottom, a first side and a second side extending between the top and the bottom;
   a pair of circular segments each defined by a chord of a circle, said pair of circular segments respectively affixed to said pair of sides, each of said pair of circular segments having a planar surface affixed respectively to the first and second sides of said central member, the planar surface having a length greater than a width of said central member such that said pair of circular segments has a first portion extending outwardly beyond said central member and such that said pair of circular segments has a second portion extending outwardly beyond said central member;

a first element affixed to the top of the central member and between the first portions of said pair of circular segments; and a second element affixed to the bottom of the central member and between the second portions of said pair of circular segments, each of said pair of circular segments having a curved surface opposite said central member, each of the first and second elements having a curved surface opposite said central member, the curved surface and said pair of curved segments and the curved surface of said first and second elements being continuous.

2. The furniture component of claim 1, said central member, said pair of circular segments, and said first and second elements being formed of a wooden material.

3. The furniture component of claim 1, said central member having a generally square cross-section.

4. The furniture component of claim 1, said central member being formed of a plurality of sheets that are laminated together.

5. The furniture component of claim 1, said central member being entirely surrounded by said pair of circular segments and said first and second elements.

6. The furniture component of claim 1, each of said pair of circular segments having a curved surface opposite to said planar surface, said curved surface forming an exterior of the furniture component.

7. The furniture component of claim 1, said first element having a planar surface affixed to the top of said central member, said second element having a planar surface affixed to the bottom of said central member, each of said first and second circular elements having a curved surface opposite to the planar surface thereof.

8. The furniture component of claim 1, the curved surfaces of said pair of circular segments and said first and second elements being arranged in a circular configuration.

9. The furniture component of claim 1, said pair of circular segments and said first and second elements being adhesively affixed to said central member.

* * * * *